(No Model.)
J. E. TARBOX.
ELECTRICAL INDICATOR FOR WEIGHING SCALES.
No. 374,013. Patented Nov. 29, 1887.
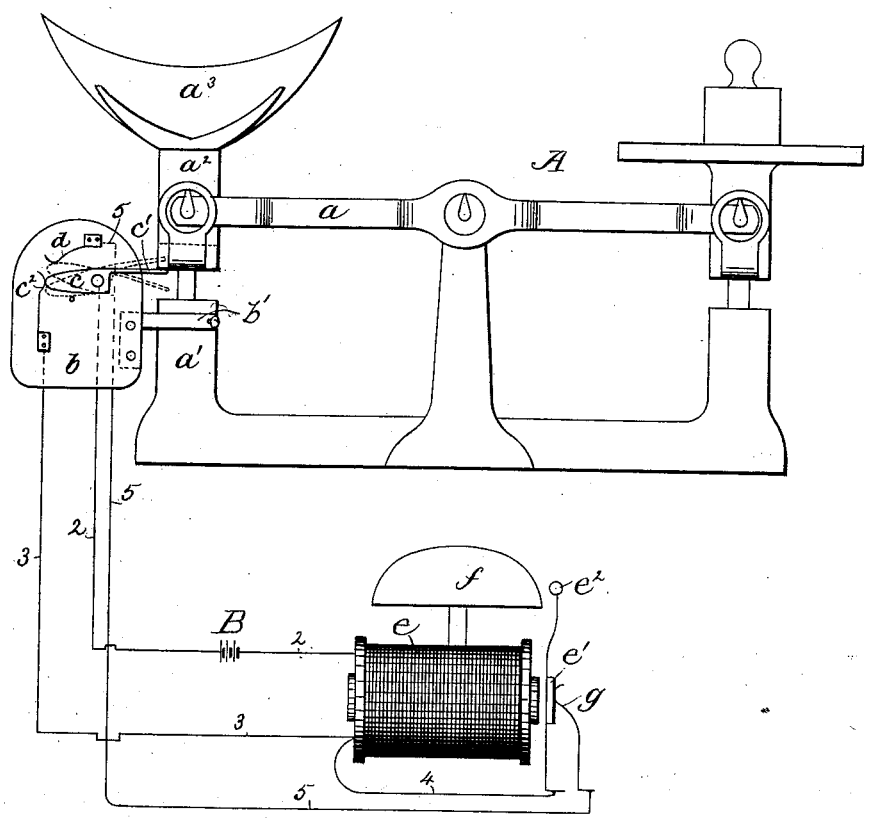
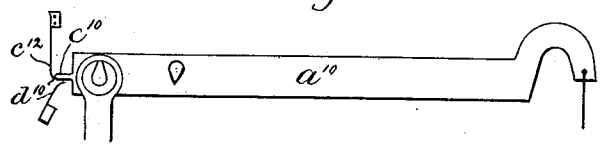
Witnesses,
Jas. J. Maloney.
M. E. Hill.
Inventor,
James E. Tarbox,
by Jos. P. Livermore
Att'y.

UNITED STATES PATENT OFFICE.

JAMES E. TARBOX, OF LYNN, MASSACHUSETTS.

ELECTRICAL INDICATOR FOR WEIGHING-SCALES.

SPECIFICATION forming part of Letters Patent No. 374,013, dated November 29, 1887.

Application filed January 22, 1887. Serial No. 225,073. (No model.)

*To all whom it may concern:*

Be it known that I, JAMES E. TARBOX, of Lynn, county of Essex, State of Massachusetts, have invented an Improvement in Indicators for Weighing Apparatus, of which the following description, in connection with the accompanying drawings, is a specification, like letters on the drawings representing like parts.

The object of my invention is to provide an indicator which will show, preferably by an audible signal, when the proper amount of material has been placed in the scale-pan or receiver of a weighing apparatus, and which will also sound a continuous alarm when the scale pan or receiver is overweighted. The device will thus serve as a check to prevent attendants in stores from giving overweight, and will thus afford a large saving to the proprietor of the store.

The device consists, essentially, of a circuit-closer having a movable member operated by some moving part of the weighing apparatus, so as to be closed when the material being weighed just overbalances the counterbalancing-weight, or, in other words, when full weight of the material is attained. This movement of the circuit-closer will close the circuit through an electro-magnet, herein shown as having its armature provided with a bell-hammer, which thus strikes a single tap on the bell when the desired weight is reached. If, however, too much material is added to the scale pan or receiver, it produces a further movement of the circuit-closer, which closes another circuit, preferably through the same electro-magnet, but including a circuit-closer controlled by the movement of the armature, so that when the second circuit is closed the bell will operate as a vibrator, and will continue to sound until the overweight is removed from the scale-pan. This continuous alarm will notify the attendant that too much weight is being given and that a portion of the material should be removed in order to give full weight only, and the frequent or prolonged operation of the overweight-signal will also call the attention of the proprietor of the store to the fact that overweight is being given, thus enabling him to check the practice. The movement of the scale accompanied by the single tap or full-weight signal will satisfy the customer that full weight is being given.

Figure 1 is a side elevation of a weighing apparatus provided with an indicator embodying this invention, the circuits of the indicating mechanism being shown in diagram; and Fig. 2, a detail showing a modified construction.

The indicator is preferably made so that it can be attached to the usual scales or weighing apparatus without any change in the latter, and is shown in this instance as applied to an ordinary balance-beam weighing-scale, A, such as is commonly used by grocers; but it is obvious that the invention can be readily applied to platform-scales or other weighing apparatus in which a balancing-weight is used either with or without multiplying-levers.

The portion of the indicator that co-operates directly with the movable scale-beam $a$ is supported on a frame, $b$, shown as adapted to be fastened by a suitable clamping device, $b'$, upon one of the uprights $a'$ of the frame of the scale that is below the supporting device $a^2$ for the scale pan or receiver $a^3$, in which the material to be weighed is placed. The said clamp $b'$ may consist of a ring of suitable size to embrace the upright $a'$ of the weighing apparatus, as commonly made, being fastened thereon by a suitable set-screw. The said frame $b$ is provided with a circuit-closer, one member, $c$, of which is shown in Fig. 1 as pivoted upon the said frame $b$ and provided with a finger, $c'$, that projects into the path of the scale-pan support $a^2$ in such manner that when the latter moves downward it will engage the finger $c'$ and move the circuit-closer $c$, which is delicately balanced, so as to normally hold the finger $c'$ up, but afford extremely small resistance to its downward movement. When the member $c$ of the circuit-closer is thus moved by the scale when the full weight has been placed in the scale-pan, it comes in contact with the other member, $c^2$, of the circuit-closer, shown in this instance as a spring which makes very light contact with the member $c$ when the latter moves past the said spring in either direction.

The members $c$ $c^2$ of the circuit-closer form the terminals of a circuit, 2 3, including a battery, B, and an electro-magnet, $e$, the armature $e'$ of which is provided with a bell-hammer, $e^2$, which, when the magnet $e$ is energized, strikes a blow on the bell $f$. As the circuit 2

3 is complete up to the circuit-closer $c\ c'$, the magnet will be energized but once and will strike but a single tap on the bell when the members $c\ c'$ come in contact, and this single tap will indicate that full weight has been placed in the scale-pan. If, however, additional weight is placed in the scale-pan, the latter will move downward farther and will cause a further movement of the member $c$ of the circuit-closer, which will bring it in contact with the member $d$, which, with the said member $c$, forms another circuit-closer, controlling another circuit, 2 4 5, through the battery B and magnet $e$, and also including as a part of the circuit the armature of the said magnet and a back contact-spring, $g$, therefor, so that when the circuit 2 4 5, controlled by the circuit-closer $c\ d$, is closed at $c\ d$ the bell-hammer $e^2$ will be vibrated and ring the bell $c$ continuously, and this overweight-alarm will continue to sound until the surplus material is removed from the scale-pan, when it will return to its balanced condition, and in returning will open the circuit-closer $c\ d$ and again close the one $c\ c'$, thus giving another single tap on the bell and indicating that full weight is in the scale-pan.

The invention is not limited to the specific construction of the circuit-closer illustrated or to its application to the particular kind of weighing apparatus chosen to illustrate the invention, as it is obvious that the construction of the circuit-closer may be widely varied and that devices of this kind may be readily applied to weighing apparatus of various kinds. In Fig. 2, for example, the indicator is shown as applied to the beam of a platform-scale, and in this scale the movable member $c^{10}$ of the circuit-closer is connected and moves with the moving part of the weighing apparatus itself—that is, with the beam $a^{10}$, as shown in this instance—and in such movement makes contact with the other member, $c^{12}$, of the circuit-closer for the full-weight indicator, and by still farther movement makes contact with the other member, $d^{10}$, of the circuit-closer for the overweight-indicator, as will be readily understood.

I claim—

1. The combination, with a weighing apparatus, of a circuit-closer one member of which consists of a pivoted lever having one arm in the position to be engaged by a moving part of the weighing apparatus and its other arm weighted to slightly overbalance said engaging-arm, and a co-operating member arranged as described with relation to the said pivoted member, whereby the latter moves past the former and makes rubbing contact therewith, and a second co-operating member engaged by the said pivoted member after it has passed by the first co-operating member, substantially as described.

2. The combination, with a weighing apparatus, of two circuit-closers operated thereby, as described, one being closed when full weight is placed in the receiver of the weighing apparatus and the other when more than full weight is placed therein, and an indicating-instrument controlled by said circuit-closers and circuits co-operating therewith, one passing directly through the magnet of the indicating-instrument and the other through the said magnet and the armature, and a back contact for said armature of the said instrument, as set forth, whereby the instrument has a momentary operation when one circuit-closer is closed and a continuous operation when the other is closed, substantially as and for the purpose set forth.

3. The combination, with a weighing apparatus, of a circuit-closer one member of which consists of a pivoted lever having one arm in position to be engaged by a moving part of the weighing apparatus and its other arm weighted to slightly overbalance said engaging-arm, and a co-operating member arranged as described with relation to said pivoted member, whereby the latter moves past the former and makes rubbing contact therewith, substantially as described.

4. The combination, with a weighing apparatus, of a circuit-closer consisting of a movable member and a co-operating contact-piece and a supporting-frame therefor, provided with a clamping device by which it may be attached to the frame-work of the weighing apparatus, with the movable member of the circuit-closer in position to be operated by the movable portion of the weighing apparatus, substantially as described.

In testimony whereof I have signed my name to this specification in the presence of two subscribing witnesses.

JAMES E. TARBOX.

Witnesses:
Jos. P. Livermore,
Jas. J. Maloney.